(12) United States Patent
Tecu et al.

(10) Patent No.: US 8,493,579 B2
(45) Date of Patent: Jul. 23, 2013

(54) WIRELESS PRINTING FROM A DEVICE OUTSIDE THE NETWORK

(75) Inventors: Kirk Steven Tecu, Longmont, CO (US); Mabry Frazier Dozier, III, Lafayette, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 13/249,701

(22) Filed: Sep. 30, 2011

(65) Prior Publication Data

US 2013/0083337 A1  Apr. 4, 2013

(51) Int. Cl.
*G06F 3/12* (2006.01)
*H04N 1/00* (2006.01)

(52) U.S. Cl.
USPC .......................................... 358/1.13; 358/402

(58) Field of Classification Search
USPC .............. 358/1.1, 1.13, 1.14, 1.15, 1.18, 402; 709/201, 203, 249
See application file for complete search history.

(56) References Cited

U.S. PATENT DOCUMENTS

| | | | |
|---|---|---|---|
| 7,006,242 B2 * | 2/2006 | Smith et al. | 358/1.15 |
| 7,616,337 B2 * | 11/2009 | Hayashi | 358/1.15 |
| 7,830,539 B2 * | 11/2010 | Yajima et al. | 358/1.15 |
| 2010/0309510 A1 * | 12/2010 | Hansen | 358/1.15 |
| 2011/0085196 A1 * | 4/2011 | Liu et al. | 358/1.15 |
| 2012/0008161 A1 * | 1/2012 | Rouhana | 358/1.15 |
| 2012/0069386 A1 * | 3/2012 | St. Laurent et al. | 358/1.15 |
| 2012/0206751 A1 * | 8/2012 | Bradshaw et al. | 358/1.13 |
| 2012/0250065 A1 * | 10/2012 | Partridge et al. | 358/1.14 |

* cited by examiner

*Primary Examiner* — Gabriel Garcia
(74) *Attorney, Agent, or Firm* — Osha Liang LLP

(57) ABSTRACT

A method for printing an electronic document (ED) using a multifunction printer (MFP), including: obtaining, by the MFP, an image by scanning a screen of a mobile device displaying a graphical code having a unique identifier (UID) of a print job associated with the ED; extracting, by the MFP, the UID of the print job from the image; sending, by the MFP, the UID of the print job to a print server over a first network operatively connecting the MFP and the print server; receiving, by the MFP and in response to sending the UID, the print job associated with the ED over the first network; and printing, by the MFP, a hardcopy of the ED after receiving the print job.

21 Claims, 4 Drawing Sheets

WIRELESS PRINTING FROM A DEVICE OUTSIDE THE NETWORK

BACKGROUND

A multifunction printer (MFP) is a machine which incorporates the functionality of multiple devices in one, so as to have a smaller footprint. MFPs typically provide centralized document management, distribution, and production in small and large business settings. Moreover, an MFP may be a hardware device within (i.e., accessible via) a secure network of the business and act as a combination of a printer, a scanner, a photocopier, a fax, and/or an email device.

Mobile devices of all sizes and processing speeds are becoming increasingly popular. These mobile devices execute various software applications including software applications that obtain and/or generate electronic documents (EDs). Even though the EDs may be viewable on the screens of the mobile devices, users still wish to print hardcopies of the EDs from the mobile devices. However, the printers may be located on different networks than the mobile devices and/or the identities of the printers might not be know to the users or the mobile devices.

SUMMARY

In general, in one aspect, the invention relates to a method for printing an electronic document (ED) using a multifunction printer (MFP). The method comprises: obtaining, by the MFP, an image by scanning a screen of a mobile device displaying a graphical code comprising a unique identifier (UID) of a print job associated with the ED; extracting, by the MFP, the UID of the print job from the image; sending, by the MFP, the UID of the print job to a print server over a first network operatively connecting the MFP and the print server; receiving, by the MFP and in response to sending the UID, the print job associated with the ED over the first network; and printing, by the MFP, a hardcopy of the ED after receiving the print job.

In general, in one aspect, the invention relates to a method for managing a print job associated with an electronic document (ED). The method comprises: obtaining, by a print server, the print job associated with the ED from a mobile device over a first network operatively connecting the print server and the mobile device, wherein the print job corresponds to a unique identifier (UID) generated by the mobile device; obtaining, by the print server, the UID from a multifunction printer (MFP) over a second network operatively connecting the print server and the MFP, wherein the MFP extracts the UID from an image generated by scanning a screen of the mobile device displaying a graphical code comprising the UID; and sending, in response to obtaining the UID from the MFP, the print job associated with the ED to the MFP over the second network, wherein the MFP prints the ED.

In general, in one aspect, the invention relates to a non-transitory computer readable storage medium storing instructions for printing an electronic document (ED) using a multifunction printer (MFP). The instructions comprise functionality to: obtain, using the MFP, an image by scanning a screen of a mobile device displaying a graphical code comprising a unique identifier (UID) of a print job associated with the ED; extract, using the MFP, the UID of the print job from the image; send, using the MFP, the UID of the print job to a print server over a first network operatively connecting the MFP and the print server; receive, using the MFP and in response to sending the UID, the print job associated with the ED over the first network; and print, using the MFP, a hardcopy of the ED after receiving the print job.

In general, in one aspect, the invention relates to a non-transitory computer readable storage medium storing instructions for managing a print job associated with an electronic document (ED). The instructions comprise functionality to: obtain, using a print server, the print job associated with the ED from a mobile device over a first network operatively connecting the print server and the mobile device, wherein the print job corresponds to a unique identifier (UID) generated by the mobile device; obtain, using the print server, the UID from a multifunction printer (MFP) over a second network operatively connecting the print server and the MFP, wherein the MFP extracts the UID from an image generated by scanning a screen of the mobile device displaying a graphical code comprising the UID; and send, in response to obtaining the UID from the MFP, the print job associated with the ED to the MFP over the second network, wherein the MFP prints the ED.

In general, in one aspect, the invention relates to a system for printing a print job associated with an electronic document (ED). The system comprises: a mobile device comprising a screen and configured to display a graphical code comprising a unique identifier corresponding to the print job on the screen; a multifunction printer (MFP) configured to generate an image by scanning the screen and extract the UID from the image; and a print server configured to receive the UID from the MFP over a first network and send, in response to receiving the UID, the print job to the MFP over the first network, wherein the MFP prints the ED after receiving the print job from the print server.

Other aspects of the invention will be apparent from the following description and the appended claims.

DETAILED DESCRIPTION

Figure 1:
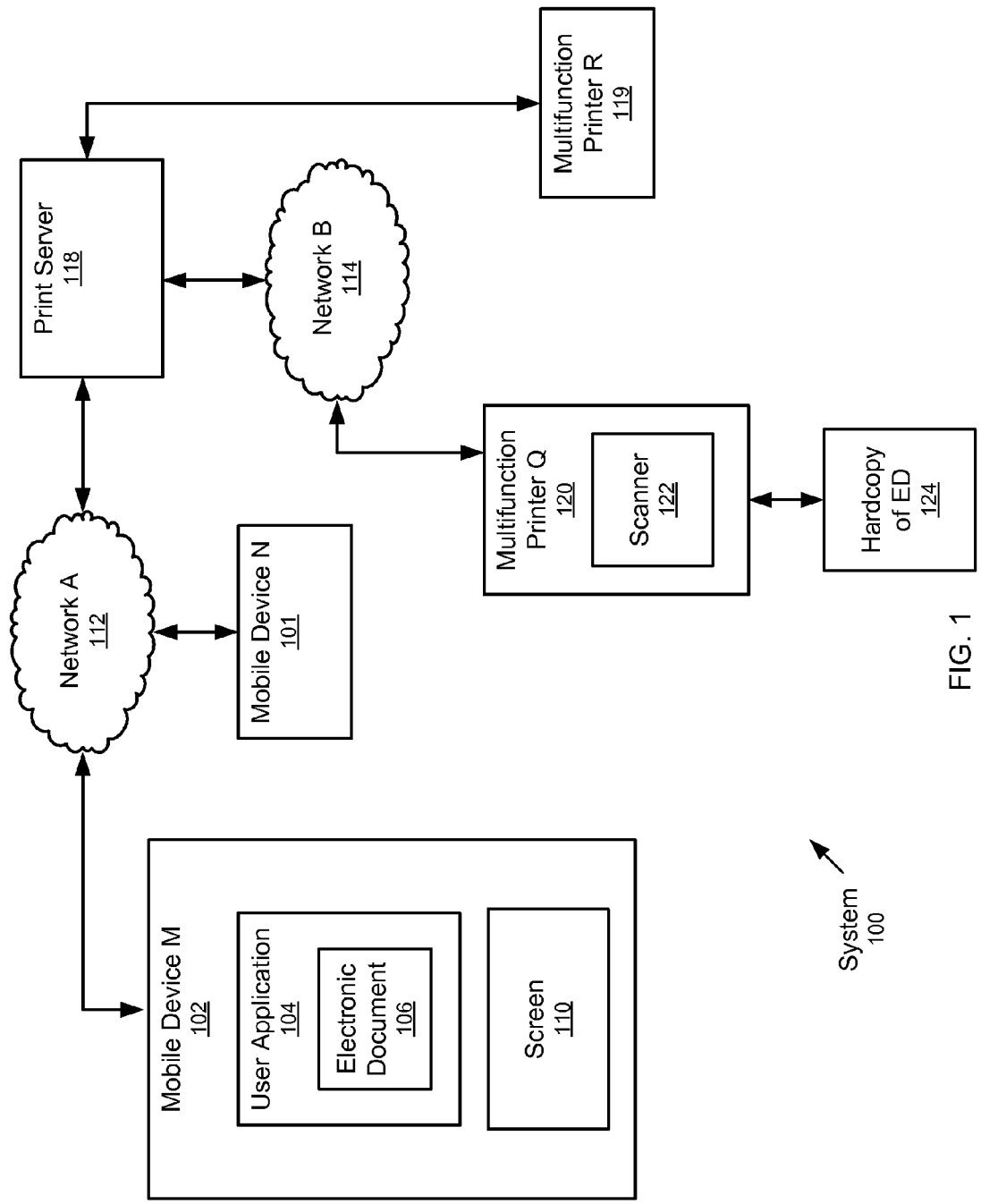
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for printing/managing a print job associated with an electronic document (ED). Specifically, a mobile device may generate a unique identifier (UID) for the print job and send the print job with the UID to a print server using a wireless network. The mobile device may also generate and display a graphical code (e.g., two-dimensional (2D) code, a data glyph) including the UID. A MFP may then obtain an image having the graphical code by scanning the screen of the mobile device displaying the graphical code. After extracting the UID from the image, the MFP may send the UID to the print server using a network different from the wireless network. The print server identifies the print job based on the UID received from the MFP, and sends the print job to the MFP. The print server may also modify the print job to be compatible with a printing scheme supported by the MFP.

FIG. 1 shows a system (100) in accordance with one or more embodiments of the invention. As shown in FIG. 1, the system (100) includes one or more mobile devices (e.g., Mobile Device N (101), Mobile Device M (102)), a print server (118), and one or more MFPs (e.g., MFP Q (120), MFR R (119)). As also shown in FIG. 1, the print server (118) and the mobile device M (102) are operatively connected by network A (112), while the print server (118) and the MFP Q (120) are operatively connected by network B (114). The components (101, 102, 112, 114, 118, 119, 120) of FIG. 1 are discussed in detail below.

In one or more embodiments of the invention, the mobile device M (102) executes the user application (104). Accordingly, the mobile device M (102) may be a smart phone, a personal digital assistant (PDA), a tablet, a laptop computer, an e-reader, etc. Further, the mobile device N (101) has essentially the same architecture and functionality as the mobile device M (102). The user application (104) is a software application operated by a user and configured to obtain, input, generate, display, and/or print an ED (e.g., Electronic Document (106)) having any number of pages. Accordingly, the user application (104) may be a word processor, slide presentation software, spreadsheet software, graphics software, video editor, Internet browser, and so forth. The ED (106) may be a report or form and may be saved in any format including portable document format (PDF) and Office Open XML (OOXML).

In one or more embodiments of the invention, the mobile device M (102) is configured to generate a print job. The print job may be generated in response to a request from a user of the mobile device M (102) to print the ED (106). Specifically, the mobile device M (102) includes software (e.g., a print driver (not shown)) for converting/packaging the data in the ED (106) according to one or more various printing schemes.

For example, in the case of page descriptor language (PDL) printing schemes, the mobile device M (102) generates a print job described in PDL based on the contents of the ED (106). The PDL commands/instructions include various print objects (e.g., text objects, graphic objects, image objects) and control objects (e.g., blend and transparency commands, color management information) to describe the ED (106) for printing. The MFP (e.g., MFP Q (120)) may then interpret the PDL commands/instructions to generate page images (i.e., the MFP rasterizes the objects) and print a hardcopy of the ED (106) based on the page images.

As another example, in the case of raster printing, the mobile device M (102) generates page images (i.e., rasterized image data such as bitmap data) based on the contents of the ED (106) and the printing options. The MFP (e.g., MFP Q (120), MFP R (119)) may then print a hardcopy of the ED (106) from the page images.

As yet another example, the print job generated by the mobile device M (102) may include the ED (106) described/represented using a document markup language (e.g., OOXML). Accordingly, the objects (e.g., text characters, symbols, graphical objects) and the properties (e.g., spacing, fonts, font sizes, etc.) of the ED (106) may be recorded as attributes within the tags of the document markup language. The MFP (e.g., MFP Q (120), MFP R (119)) may then calculate the page positions of all objects based on the attributes/tags (i.e., the MFP executes a layout of the ED (106)) in order to print a hardcopy of the ED (106).

In one or more embodiments of the invention, the mobile device M (102) is configured to generate a UID for the print job. The UID may include a file name of the ED (106), an author of the ED (106), a size of the ED (106), an identification of the mobile device M (102) or a user of the mobile device M (102), a creation timestamp recording the date/time the ED (106) was created, and/or a creation timestamp recording the date/time the print job was created. The UID may also include a global unique identifier (GUID) of any size generated using any algorithm including algorithms based on the Media Access Control (MAC) address of the mobile device M (102). The print job may include the UID. For example, the UID may be recorded within a print ticket of the print job.

In one or more embodiments of the invention, the mobile device M (102) is configured to send (i.e., transmit) the print job with the UID to the print server (118) using the network A (112). Alternatively, the print job and the UID may be sent (i.e., transmitted) separately to the print server (118) using network A (112). Network A (112) may be a network of any size (e.g., local area network (LAN), wide are network (WAN)) and of any type (e.g., cellular network, public wireless network, secure network, unsecure network, etc.) having wireless and/or wired segments.

In one or more embodiments of the invention, the mobile device M (102) is configured to generate a graphical code including the UID. The graphical code may correspond to a 1D barcode, a 2D code (e.g., a quick response (QR) code), a data glyph, etc. The graphical code may include an encrypted version of the UID. The mobile device M (102) may display the graphical code on the screen (110) of the mobile device M (102).

In one or more embodiments of the invention, the MFP Q (120) is a machine which incorporates the functionality of multiple devices (e.g., printer, scanner, photocopier, a fax device, and/or an email device, etc.) in one. The MFP R (119) has essentially the same architecture and functionality as the MFP Q (120), except the MFP R (119) is connected to the print sever using a different network (not shown). The MFP Q (120) may operate in a cloud printing mode. When the cloud printing mode is invoked (e.g., by a user of the mobile device M (102)), the scanner (122) of the MFP Q (120) may be used to obtain an image of the graphical code. Specifically, the screen (110) of the mobile device M (102) may be held/pressed against or within a sensitive distance of the scanner (122), while the screen (110) is displaying the graphical code. The MFP Q (120) may be configured to extract and possibly decrypt the UID from the image.

Although embodiments of the invention have focused on obtaining the image with the graphical code from the scanner (122), those skilled in the art, having the benefit of this detailed description, will appreciate that the MFP Q (120) may obtain the image through various means. For example, the mobile device M (102) may wirelessly transmit (e.g., via infrared or Bluetooth) the image to the MFP Q (120). As another example, the MFP Q (120) may obtain the image from a portable storage device (e.g., universal serial bus flash drive) inserted into the MFP Q (120). As yet another example, the MFP Q (120) may download the image from a website.

In one or more embodiments of the invention, the MFP Q (120) is configured to send (i.e., transmit) the UID to the print server (118) using network B (114). Specifically, the UID may be sent as an attribute or field of a request generated by the MFP Q (120) for the print job corresponding to the UID.

The request may identify the MFP Q (120) and the one or more printing schemes supported by the MFP Q (120). Moreover, Network B (114) may be of any size (e.g., local area network (LAN), wide are network (WAN)) and of any type (e.g., private network, enterprise secure network, etc.) having wireless and/or wired segments. The request and any response may comply with the security protocols, if any, placed on network B (114).

In one or more embodiments of the invention, the MFP Q (120) is configured to receive the print job corresponding to the UID from the print server (118) using network B (114). The print job may be received in response to sending the UID to the print server (118). The MFP Q (120) is also configured to print a hardcopy (124) of the ED (106) from the print job received from the print server (118). Specifically, in the case of PDL printing schemes, the MFP Q (120) may interpret the incoming PDL commands in order to generate page images (i.e., the MFP Q (120) rasterizes the objects). In the case of print jobs with EDs described/represented using a document markup language (e.g., OOXML), the MFP Q (120) may calculate the page positions (i.e., perform a layout) of all elements in the ED (106).

In one or more embodiments of the invention, the print server (118) is a cloud printing server configured to store one or more print jobs received from one or more mobile devices (e.g., mobile device N (101), mobile device M (102)). Further, the print server (118) is configured to send (i.e., transmit) one or more print jobs to one or more MFPs (e.g., MFP Q (120), MFP R (119)). Specifically, each print job stored in the print server (118) corresponds to a UID. The UID may be recorded in the print job and/or the UID may be stored by the print server (118) separately from the print job. The print server (118) may be configured to compare a received UID (e.g., a UID in a request from the MFP Q (120)) or a portion of the received UID to the one or more stored UIDs corresponding to the one or more stored print jobs. In the event a match is found, the MFP Q (120) may be configured to send the corresponding print job to the requesting MFP (e.g., MFP Q (120)).

In one or more embodiments of the invention, the print server (118) is configured to modify a print job to be compatible with a printing scheme supported by the requesting MFP (e.g., MFP Q (120)), before sending the print job to the requesting MFP. For example, if the print job stored in the print server (118) includes an ED described/represented using a document markup language (e.g., OOXML), and if the requesting MFP Q (120) only supports a PDL printing scheme, the print server (118) may generate a plurality of PDL commands/instructions including various print objects (e.g., text objects, graphic objects, image objects) and control objects (e.g., blend and transparency commands, color management information) from the ED described/represented using a document markup language. As discussed above, the request received by the print server (118) may identify the printing scheme(s) supported by the requesting MFP. Alternatively, the print server (118) may include a lookup table or directory recording the printing scheme(s) supported by various MFPs.

In one or more embodiments of the invention, the print server (118) manages one or more print accounts. Each print account may correspond to a mobile device (e.g., Mobile Device N (101), Mobile Device M (102)), a user of the mobile device (101, 102), or a MFP (e.g., MFP Q (120), MFP R (119)), etc. Further, each print account may track printing statistics (i.e., number of print jobs submitted, number of print jobs printed, number of pages printed, number of color pages printed, cost for print job, etc.) for the owning entity of the print account. Accordingly, the printing statics are changed/modified when the print server (118) receives print jobs from the mobile devices (e.g., Mobile Device N (101), Mobile Device M (102)) and/or sends print jobs to one or more MFPs (119, 120).

In one or more embodiments of the invention, the mobile device M (102) stores the identities of the EDs associated with the print jobs on the print server (118), including print jobs that did not originate from (i.e., print jobs not sent by) the mobile device M (102). The mobile device M (102) also stores the UIDs corresponding to the print jobs stored on the print server (118). Accordingly, the user of the mobile device M (102) may select one or more of the EDs, and a graphical code with the corresponding UID may be displayed on the mobile device M (102). However, the mobile device M (102) need not transmit the print job to the print server (118) in response to the selection (i.e., the print job is already stored on the print server (118)).

Figure 2:
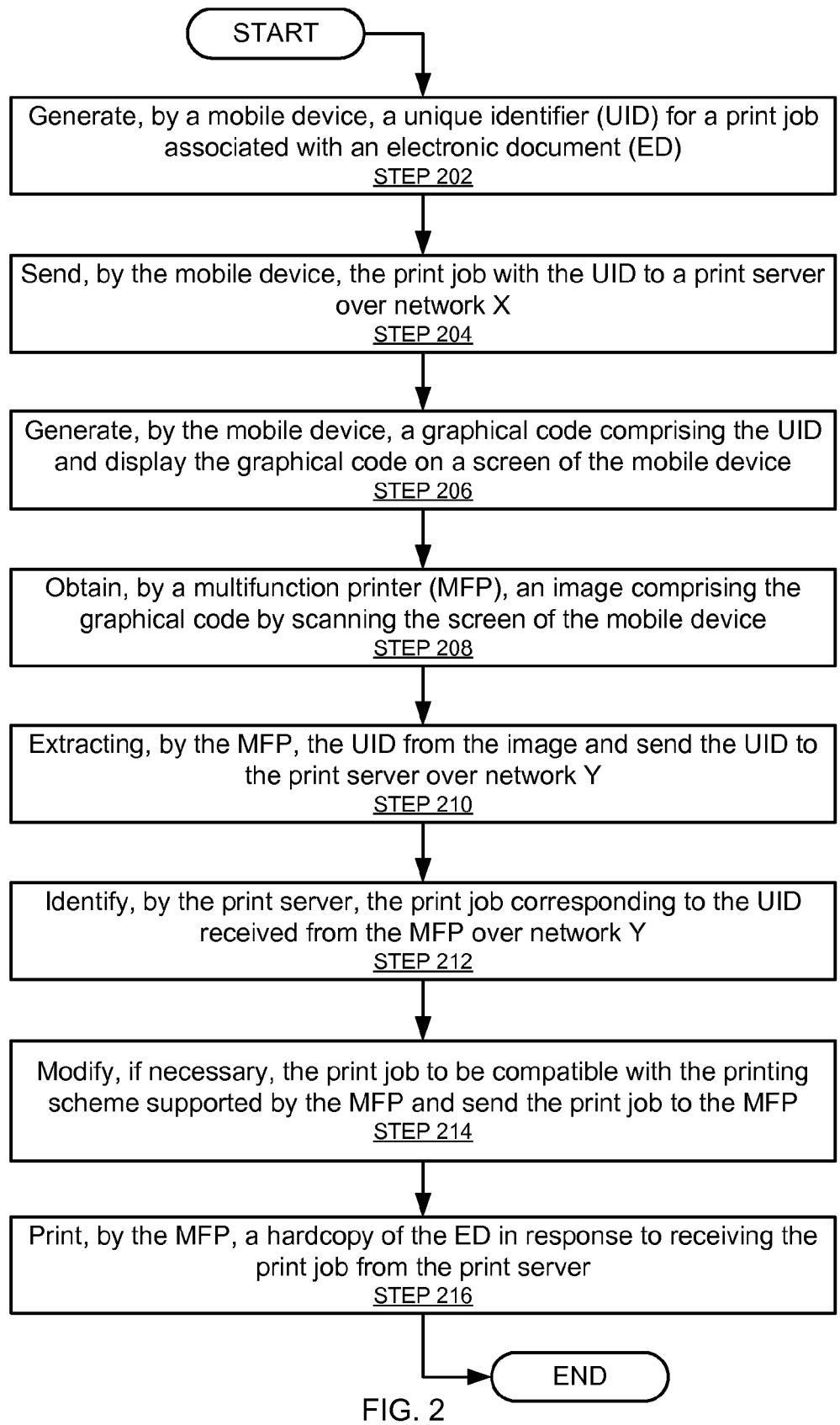
FIG. 2 shows a flowchart in accordance with one or more embodiments of the invention.

FIG. 2 shows a flowchart in accordance with one or more embodiments of the invention. The process shown in FIG. 2 may be used, for example, with the components of system (100) (e.g., Mobile Device M (102), MFP Q (120), Print Server (118), discussed above in reference to FIG. 1) to print/manage a print job associated with an ED. One or more steps shown in FIG. 2 may be omitted, repeated, and/or performed in a different order among different embodiments of the invention. Accordingly, embodiments of the invention should not be considered limited to the specific number and arrangement of steps shown in FIG. 2.

Initially, the UID for the print job is generated by the mobile device (STEP 202). As discussed above, the UID may include a file name of the ED, an author of the ED, a size of the ED, an identification of the mobile device or a user of the mobile device, a creation timestamp recording the date/time the ED was generated, and/or a creation timestamp recording the date/time the print job was generated. The UID may also include a GUID of any size generated using any algorithm including algorithms based on the Media Access Control (MAC) address of the mobile device. The print job may include the UID. For example, the UID may be recorded within a print ticket of the print job.

In STEP 204, the print job and UID are sent by the mobile device to a print server using a network (i.e., Network X). As discussed above, the print job may be compatible with one or more printing schemes (e.g., page descriptor language (PDL) printing schemes, raster printing, printing schemes in which the ED is described/represented using a document markup language (e.g., OOXML)). As also discussed above, the network (i.e., Network X) may be of any size (e.g., local area network (LAN), wide are network (WAN)) and of any type (e.g., cellular network, public wireless network, secure network, unsecure network, etc.) having wireless and/or wired segments. However, the user of the mobile device need not specify a printer or MFP for the print job. In other words, neither the print job nor the UID identifies a printer or MFP.

In STEP 206, a graphical code having the UID is generated by the mobile device and displayed on a screen of the mobile device. As discussed above, the graphical code may correspond to a 1D barcode, a 2D code (e.g., a QR code), a data glyph, etc. In STEP 208, an image having the graphical code is obtained by scanning the display screen of the mobile device displaying the graphical code. Specifically, the image is obtained by a MFP with a scanner and the mobile device is held/pressed against the scanner while the mobile device is displaying the graphical code.

In STEP 210, the UID is extracted from the image and the MFP sends (i.e., transmits) the UID to the print server over a network (Network Y). In one or more embodiments of the invention, the MFP must first be placed (e.g., invoked by a user of the mobile device) in a cloud printing mode before the UID is extracted from the image and transmitted to the print server. In one or more embodiments of the invention, UID is an attribute or a field in a request generated by the MFP and sent to the print server over the network (i.e., Network Y). The request may identify the MFP and/or the printing scheme(s) supported by the MFP. Moreover, network Y may be of any size (e.g., local area network (LAN), wide are network (WAN)) and of any type (e.g., private network, enterprise secure network, etc.) having wireless and/or wired segments. The request and any response may comply with the security protocols, if any, placed on network Y. Those skilled in the art, having the benefit of this detailed description, will appreciate that network X and network Y are separate networks having different ownerships, different security policies, different transmission schemes, etc.

In STEP 212, the print server receives the request including the UID from the MFP and identifies the print job stored on the print server corresponding to the UID. In other words, the print server may compare the UID received from the MFP with the UIDs of the print jobs stored on the print server to determine a match. The print server may also identify, from/based on the request, the identity of the MFP and the printing scheme(s) supported by the MFP.

In one or more embodiments of the invention, STEPS 206, 208, and/or 210 are executed before STEP 204. In other words, the image having the graphical code may be obtained by the MFP before the print job and the UID are sent to the print server. Further, the UID may be extracted from the image by the MFP before the print job and the UID are sent by the mobile device to the print server. Further still, the UID may be sent by the MFP to the print server before the print job and the UID are sent by the mobile device to the print server. In such embodiments, the print server buffers the UIDs received from the MFP and compares the buffered UIDs to the UIDs later received from the mobile device.

In STEP 214, the print server modifies, if necessary, the print job corresponding to the UID to be compatible with the printing scheme supported by the MFP, and sends the (modified) print job to the MFP over network Y. For example, if the print job stored in the print server includes an ED described/represented using a document markup language (e.g., OOXML), and if the requesting MFP only supports a PDL printing scheme, the print server may generate a plurality of PDL commands/instructions including various print objects (e.g., text objects, graphic objects, image objects) and control objects (e.g., blend and transparency commands, color management information) from the ED described/represented using the document markup language. As discussed above, the request received by the print server may identify the printing scheme(s) supported by the requesting MFP. Alternatively, the print server may include a lookup table or directory recording the printing scheme(s) supported by various MFPs.

In STEP 216, the MFP prints a hardcopy of the ED in response to receiving the print job from the print server. In the case of PDL printing schemes, the MFP Q (120) may interpret the incoming PDL commands in order to generate page images (i.e., the MFP rasterizes the objects). In the case of print jobs with EDs described/represented using a document markup language (e.g., OOXML), the MFP may calculate the page positions (i.e., perform a layout) of all elements in the ED.

Figure 3:
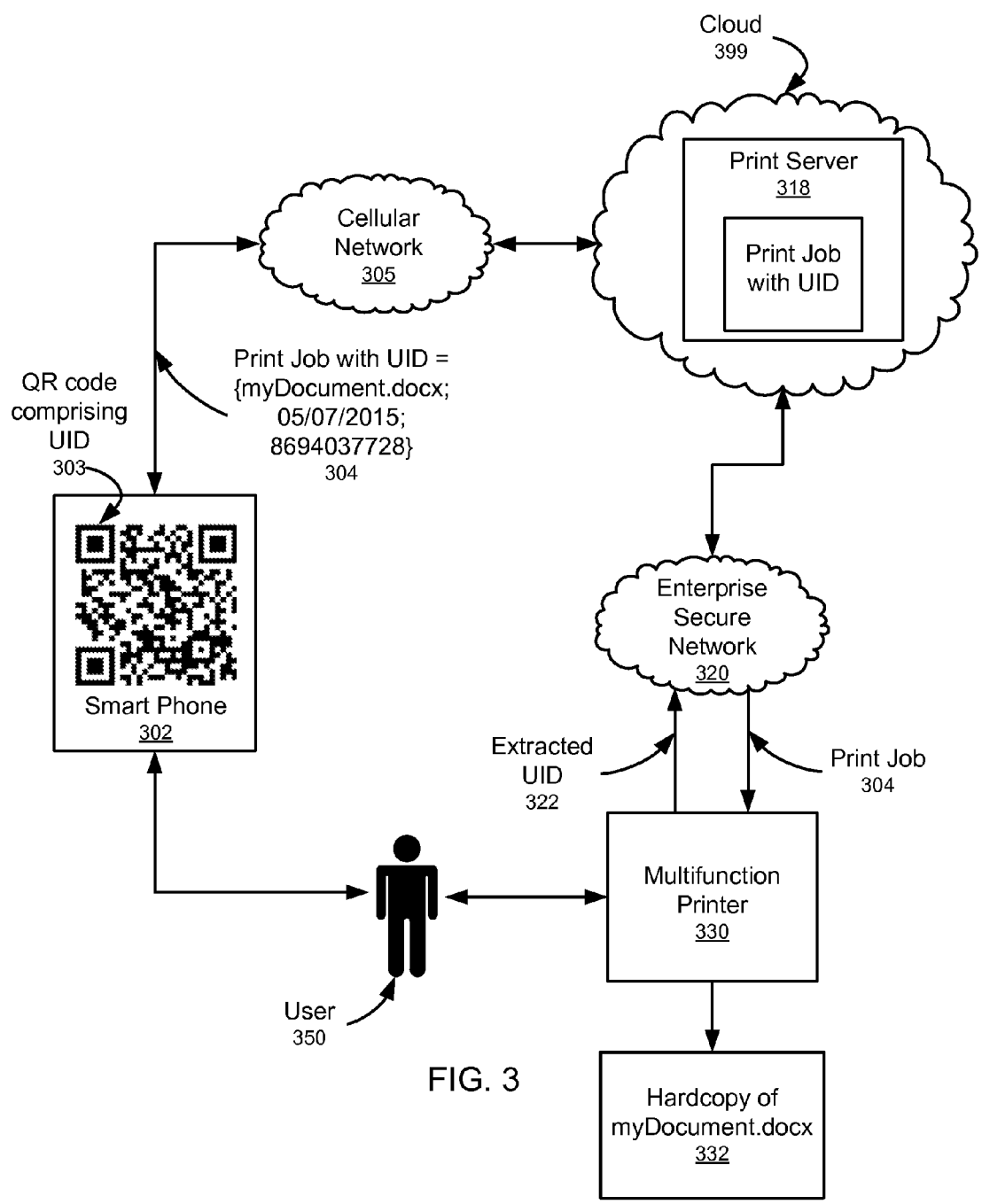
FIG. 3 shows an example in accordance with one or more embodiments of the invention.

FIG. 3 shows an example in accordance with one or more embodiments of the invention. As shown in FIG. 3, there exists a smart phone (302), a print server (318) in a cloud (399), and a MFP (330). The smart phone (302) and the print server (318) are operatively connected by a cellular network (305). Similarly, the MFP (330) and the print server (318) are operatively connected by an enterprise secure network (320).

In FIG. 3, the user (350) of the smart phone (302) has requested that the ED entitled "myDocument.docx" be printed using a cloud printing feature. In other words, the user (350) has requested that the ED be printed, but the user (350) has not specified a printer or MFP for printing the ED. Accordingly, the smart phone (302) generates a print job for the ED and a UID for the print job including the name of the ED (i.e., myDocument.docx), the creation timestamp of the print job (i.e., May 7, 2015), and a GUID (i.e., 8694037728) based on the MAC address of the smart phone (302). The print job and UID (304) are sent to the print server (318) over the cellular network (305) and stored on the print server (318). In response to generating the UID, the smart phone (302) also generates a QR code (303) comprising the UID and displays the QR code on the screen of the smart phone (302).

Still referring to FIG. 3, the user (350) invokes the cloud printing mode of the MFP (330) (e.g., using the control panel/buttons of the MFP (330)) and holds the screen of the smart phone (302) against the scanner of the MFP (330). The MFP (330) obtains an image having the QR code by scanning the smart phone (302) displaying the QR code. The MFP (330) then extracts the UID from the image, and then sends the extracted UID (322) to the print server (318). Specifically, the extracted UID (322) is sent as an attribute or field of a request to the print server (318) over the enterprise secure network (320). The print server (318) compares the extracted UID (322) received from the MFP (330) with the UIDs of the print jobs stored on the print server (318). In response to the extracted UID (322) matching the UID of the print job (304), the print job (304) is sent to the MFP (330) over the enterprise secure network (320). The MFP (330) may then print the hardcopy of the ED (332).

Embodiments of the invention may include one or more of the following advantages: an MFP on a secure network may accept print jobs from a mobile device on a different network; the ability to create a print job without specifying a printer; the ability to store a print job on a print server and then print the print job using any printer operatively connected to the print server; the ability to restrict mobile devices from attaching to the local/secure network while enabling a MFP on the local/secure network to print hardcopies of EDs generated by the mobile devices; and/or the ability to prevent an MFP from being exposed to unsecure networks; etc.

Figure 4:
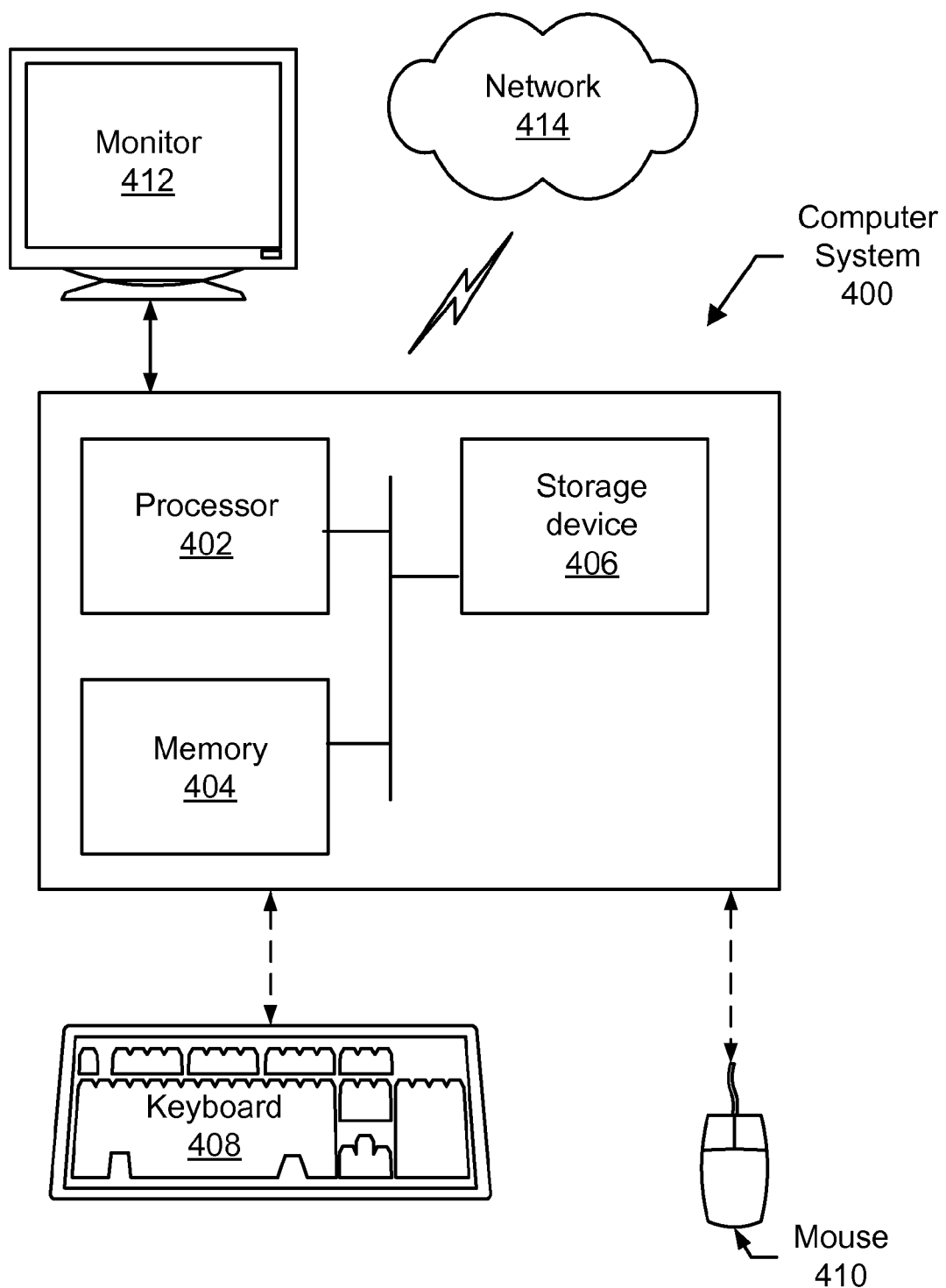
FIG. 4 shows a computer system in accordance with one or more embodiments of the invention.

Embodiments of the invention may be implemented on virtually any type of computer regardless of the platform being used. For example, as shown in FIG. 4, a computer system (400) includes one or more processor(s) (402), an associated memory (404) (e.g. random access memory (RAM), cache memory, flash memory, etc.), a storage device (406) (e.g. a hard disk, an optical drive such as a compact disk drive or digital video disk (DVD) drive, a flash memory stick, etc.), and numerous other elements and functionalities typical of today's computers (not shown). In one or more embodiments of the invention, the processor (402) is hardware. For example, the processor may be an integrated circuit. The computer system (400) may also include input means, such as a keyboard (408), a mouse (410), or a microphone (not shown). Further, the computer system (400) may include output means, such as a monitor (412) (e.g. a liquid crystal display (LCD), a plasma display, or cathode ray tube (CRT) monitor). The computer system (400) may be connected to a network (414) (e.g. a local area network (LAN), a wide area network (WAN) such as the Internet, or any other type of network) via a network interface connection (not shown). In one or more embodiments of the invention, many different types of computer systems exist, and the aforementioned input and output means may take other forms. Generally speaking, the computer system (400) includes at least the minimal processing, input, and/or output means necessary to practice embodiments of the invention.

Further, in one or more embodiments of the invention, one or more elements of the aforementioned computer system (400) may be located at a remote location and connected to the other elements over a network. Further, embodiments of the invention may be implemented on a distributed system having a plurality of nodes, where each portion of the invention (e.g. the computing device, the multifunction printer) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for printing an electronic document (ED) using a multifunction printer (MFP), comprising:
    obtaining, by the MFP, an image by scanning a screen of a mobile device displaying a graphical code comprising a unique identifier (UID) of a print job associated with the ED;
    extracting, by the MFP, the UID of the print job from the image;
    sending, by the MFP, the UID of the print job to a print server over a first network operatively connecting the MFP and the print server;
    receiving, by the MFP and in response to sending the UID, the print job associated with the ED over the first network; and
    printing, by the MFP, a hardcopy of the ED after receiving the print job.

2. The method of claim 1, further comprising:
    generating, by the mobile device, the UID for the print job; and
    sending, by the mobile device, the print job to the print server over a second network operatively connecting the mobile device and the print server.

3. The method of claim 2, further comprising:
    identifying, by the print server and in response to receiving the UID over the first network, a printing scheme supported by the MFP; and
    modifying, by the print server, the print job to be compatible with the printing scheme before sending the print job to the MFP over the first network.

4. The method of claim 3, wherein modifying the print job comprises generating a plurality of page description language (PDL) commands.

5. The method of claim 1, further comprising:
    obtaining, by the mobile device and from a user of the mobile device, a selection of the ED from a plurality of EDs,
    wherein the plurality of EDs correspond to a plurality of print jobs stored on the print server,
    wherein the ED is a form accessible to a plurality of users, and
    wherein the GUID is displayed on the screen of the mobile device in response to the selection of the ED.

6. The method of claim 1, wherein the graphical code is a two-dimensional bar code, and wherein the UID comprises a name of the ED and a creation timestamp of the ED.

7. A method for managing a print job associated with an electronic document (ED), comprising:
    obtaining, by a print server, the print job associated with the ED from a mobile device over a first network operatively connecting the print server and the mobile device,
    wherein the print job corresponds to a unique identifier (UID) generated by the mobile device;
    obtaining, by the print server, the UID from a multifunction printer (MFP) over a second network operatively connecting the print server and the MFP,
    wherein the MFP extracts the UID from an image generated by scanning a screen of the mobile device displaying a graphical code comprising the UID; and
    sending, in response to obtaining the UID from the MFP, the print job associated with the ED to the MFP over the second network,
    wherein the MFP prints the ED.

8. The method of claim 7, further comprising:
    identifying, by the printer server and in response to obtaining the UID for the MFP, a printing scheme supported by the MFP; and
    modifying, by the print server, the print job to be compatible with the printing scheme before sending the print job to the MFP over the second network.

9. The method of claim 7, further comprising:
    identifying, in response to obtaining the UID from the MFP, a print account associated with a user of the mobile device; and
    changing, after obtaining the UID from the MFP, a printing statistic of the print account.

10. The method of claim 7, wherein the graphical code is a two-dimensional bar code, and wherein the UID comprises at least one selected from a group consisting of a name of the ED and a creation timestamp of the ED.

11. The method of claim 7, wherein the print server obtains the UID from the MFP over the second network before obtaining the print job from the mobile device over the first network.

12. A non-transitory computer readable storage medium storing instructions for printing an electronic document (ED) using a multifunction printer (MFP), the instructions comprising functionality to:
    obtain, using the MFP, an image by scanning a screen of a mobile device displaying a graphical code comprising a unique identifier (UID) of a print job associated with the ED;
    extract, using the MFP, the UID of the print job from the image;
    send, using the MFP, the UID of the print job to a print server over a first network operatively connecting the MFP and the print server;
    receive, using the MFP and in response to sending the UID, the print job associated with the ED over the first network; and print, using the MFP, a hardcopy of the ED after receiving the print job.

13. The non-transitory computer readable storage medium of claim 12, wherein the UID and the graphical code are generated by the mobile device, and wherein the mobile device sends the print job to the print server using a second network operatively connecting the mobile device and the print server.

14. The non-transitory computer readable storage medium of claim 12, wherein the print server identifies a printing scheme supported by the MFP, and wherein the print server modifies the print job to be compatible with the printing scheme.

15. A non-transitory computer readable storage medium storing instructions for managing a print job associated with an electronic document (ED), the instructions comprising functionality to:
   obtain, using a print server, the print job associated with the ED from a mobile device over a first network operatively connecting the print server and the mobile device,
   wherein the print job corresponds to a unique identifier (UID) generated by the mobile device;
   obtain, using the print server, the UID from a multifunction printer (MFP) over a second network operatively connecting the print server and the MFP,
   wherein the MFP extracts the UID from an image generated by scanning a screen of the mobile device displaying a graphical code comprising the UID; and
   send, in response to obtaining the UID from the MFP, the print job associated with the ED to the MFP over the second network,
   wherein the MFP prints the ED.

16. The non-transitory computer readable medium of claim 15, the instructions further comprising functionality to:
   identify, using the printer server, a printing scheme supported by the MFP; and
   modifying, using the print server, the print job to be compatible with the printing scheme before sending the print job to the MFP over the second network.

17. A system for printing a print job associated with an electronic document (ED), comprising:
   a mobile device comprising a screen and configured to display a graphical code comprising a unique identifier corresponding to the print job on the screen;
   a multifunction printer (MFP) configured to generate an image by scanning the screen and extract the UID from the image; and
   a print server configured to receive the UID from the MFP over a first network and send, in response to receiving the UID, the print job to the MFP over the first network,
   wherein the MFP prints the ED after receiving the print job from the print server.

18. The system of claim 17, wherein the mobile device is further configured to send the print job and the UID to the MFP over a second network operatively connecting the mobile device and the print server.

19. The system of claim 18, wherein the first network is a secure network, and wherein the second network is a public wireless network.

20. The system of claim 18, wherein the print server is further configured to identify a printing scheme supported by the MFP and modify the print job to be compatible with the printing scheme before the print job is sent to the MFP.

21. The system of claim 17, wherein the graphical code is a two-dimensional barcode, and wherein the UID comprises at least one selected from a group consisting of a name of the ED and a creation timestamp of the ED.

* * * * *